United States Patent
Toujinbara et al.

(10) Patent No.: US 10,256,740 B2
(45) Date of Patent: Apr. 9, 2019

(54) POWER CONVERSION APPARATUS, POWER GENERATION SYSTEM, CONTROLLER, AND METHOD FOR CONVERTING POWER

(71) Applicant: Kabushiki Kaisha Yaskawa Denki, Kitakyushu (JP)

(72) Inventors: Hirotaka Toujinbara, Kitakyushu (JP); Yukari Takagi, Kitakyushu (JP); Masaya Yoshitomi, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/335,469

(22) Filed: Oct. 27, 2016

(65) Prior Publication Data

US 2017/0126142 A1    May 4, 2017

(30) Foreign Application Priority Data

Nov. 2, 2015  (JP) ................................. 2015-216161

(51) Int. Cl.
*H02M 7/53*    (2006.01)
*H02M 5/458*   (2006.01)
(Continued)

(52) U.S. Cl.
CPC ............. *H02M 5/458* (2013.01); *G05F 1/67* (2013.01); *H02M 7/53875* (2013.01);
(Continued)

(58) Field of Classification Search
CPC ............ H02M 5/458; H02M 7/53875; H02M 2001/0009; H02J 3/385; H02J 3/386
See application file for complete search history.

(56) References Cited

U.S. PATENT DOCUMENTS

2007/0216328 A1* 9/2007  Iura ................... H02P 23/20
                                                      318/362
2013/0027997 A1* 1/2013  Tan ..................... G05F 1/67
                                                      363/95
(Continued)

FOREIGN PATENT DOCUMENTS

CN       102904273 A     1/2013
CN       103392291 A    11/2013
(Continued)

OTHER PUBLICATIONS

Office Action dated Dec. 6, 2016 in Japanese Patent Application No. 2015-216161 (with unedited computer generated English translation).

(Continued)

*Primary Examiner* — Fred E Finch, III
*Assistant Examiner* — Rafael O De Leon Domenech
(74) *Attorney, Agent, or Firm* — Oblon, McClelland, Maier & Neustadt, L.L.P.

(57) ABSTRACT

A power conversion apparatus includes a power converter, a voltage detector, a determiner, and a drive controller. The power converter is configured to convert DC power input from an electric generation apparatus into AC power. The voltage detector is configured to detect a DC voltage input into the power converter. The determiner is configured to determine an output power command or an output current command based on whether the output power command or the output current command has a first level that is correlated in advance with a second level of the DC voltage detected by the voltage detector. The drive controller is configured to control the power converter based on the output power command or the output current command determined by the determiner.

16 Claims, 8 Drawing Sheets

(51) Int. Cl.
  *H02M 7/5387* (2007.01)
  *G05F 1/67* (2006.01)
  *H02J 3/38* (2006.01)
  *H02M 1/00* (2006.01)
(52) U.S. Cl.
  CPC ............... *H02J 3/385* (2013.01); *H02J 3/386* (2013.01); *H02M 2001/0009* (2013.01); *Y02E 10/58* (2013.01); *Y02E 10/763* (2013.01)

(56) References Cited

U.S. PATENT DOCUMENTS

2013/0336026 A1* 12/2013 Figueroa ................. H02J 3/386
                                                              363/37
2015/0085542 A1*  3/2015 Li .......................... H02M 7/44
                                                              363/95

FOREIGN PATENT DOCUMENTS

JP    11-202957 A    7/1999
JP    2014-016690 A  1/2014

OTHER PUBLICATIONS

Combined Chinese Office Action and Search Report dated Jul. 20, 2018, in Patent Application No. 201610842014.7 (with English translation), 22 pages.

\* cited by examiner

POWER CONVERSION APPARATUS, POWER GENERATION SYSTEM, CONTROLLER, AND METHOD FOR CONVERTING POWER

CROSS-REFERENCE TO RELATED APPLICATIONS

The present application claims priority under 35 U.S.C. § 119 to Japanese Patent Application No. 2015-216161, filed Nov. 2, 2015. The contents of this application are incorporated herein by reference in their entirety.

BACKGROUND

Field of the Invention

The embodiments disclosed herein relate to a power conversion apparatus, a power generation system, a controller, and a method for converting power.

Discussion of the Background

Japanese Unexamined Patent Application Publication No. 2014-16690 discloses a power generation system that includes a power converter to convert power supplied from, for example, a solar-cell electric generator into a predetermined kind of power. The power converter has a function referred to as Maximum Power Point Tracking (MPPT) control. In the MPPT control, based on current and voltage supplied from the electric generator to a power conversion section of the power converter, the power converter controls the power conversion section to maximize the power output of the power generation source.

SUMMARY

According to one aspect of the present disclosure, a power conversion apparatus includes a power converter, a voltage detector, a determiner, and a drive controller. The power converter is configured to convert DC power input from an electric generation apparatus into AC power. The voltage detector is configured to detect a DC voltage input into the power converter. The determiner is configured to determine an output power command or an output current command based on whether the output power command or the output current command has a first level that is correlated in advance with a second level of the DC voltage detected by the voltage detector. The drive controller is configured to control the power converter based on the output power command or the output current command determined by the determiner.

According to another aspect of the present disclosure, a power generation system includes an electric generator and a power conversion apparatus. The power conversion apparatus includes a power converter, a voltage detector, a determiner, and a drive controller. The power converter is configured to convert DC power input from the electric generation apparatus into AC power. The voltage detector is configured to detect a DC voltage input into the power converter. The determiner is configured to determine an output power command or an output current command based on whether the output power command or the output current command has a first level that is correlated in advance with a second level of the DC voltage detected by the voltage detector. The drive controller is configured to control the power converter based on the output power command or the output current command determined by the determiner.

According to another aspect of the present disclosure, a controller includes a determiner and a drive controller. The determiner is configured to determine an output power command or an output current command based on whether the output power command or the output current command has a level that is correlated in advance with a level of a DC voltage input into a power converter from an electric generator. The drive controller is configured to control the power converter based on the output power command or the output current command determined by the determiner.

According to the other aspect of the present disclosure, a method for converting power includes detecting a DC voltage input into a power converter from an electric generator. An output power command or an output current command is determined based on whether the output power command or the output current command has a level that is correlated in advance with a level of the DC voltage detected in the detecting step. The power converter is controlled based on the output power command or the output current command determined in the determining step.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
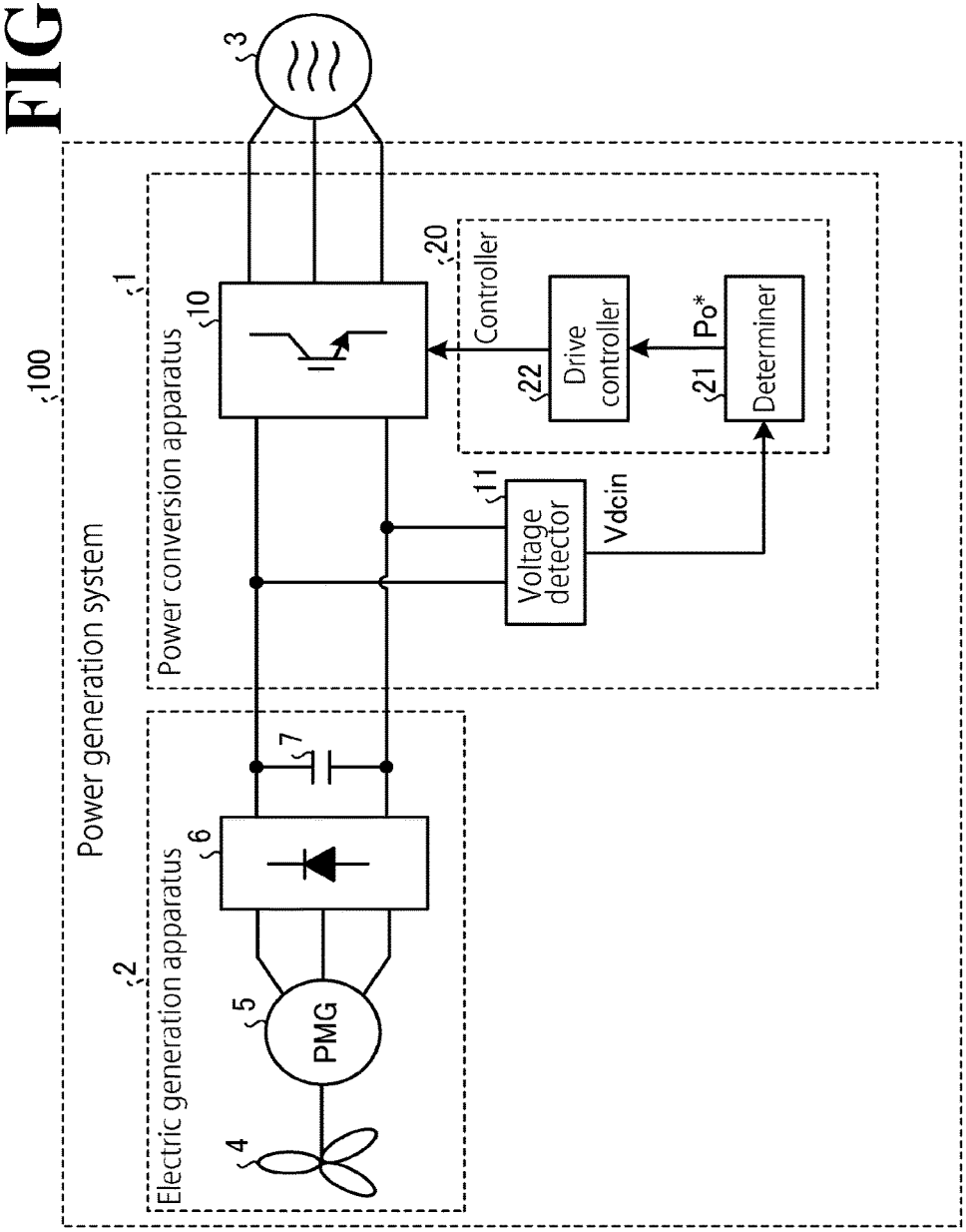
FIG. 1 is a diagram illustrating an exemplary configuration of a power generation system according to an embodiment.

The embodiments will now be described with reference to the accompanying drawings, wherein like reference numerals designate corresponding or identical elements throughout the various drawings. It is noted that the following embodiments are provided for exemplary purposes only and are not intended in a limiting sense.

1. Power Generation System

FIG. 1 is a diagram illustrating an exemplary configuration of a power generation system 100 according to this embodiment. As illustrated in FIG. 1, the power generation system 100 according to this embodiment includes a power conversion apparatus 1 and an electric generation apparatus 2. The power conversion apparatus 1 is disposed between the electric generation apparatus 2 and a power system 3.

The electric generation apparatus 2 is an electric generator that outputs DC (direct-current) power, and includes a windmill 4, an electric generator 5 (which is a non-limiting example of the AC electric generator recited in the appended claims), a rectifier 6, and a capacitor 7. The windmill 4 includes blades and a blade shaft. The generator 5 has an input shaft connected with the blade shaft of the windmill 4. A non-limiting example of the electric generator 5 is a synchronization electric generator with its input shaft rotatable with the rotation of the blade shaft thereby generating power.

The rectifier 6 rectifies AC (alternating-current) power output from the electric generator 5. The capacitor 7 smoothens the rectified power output from the rectifier 6. In this manner, AC power generated by the electric generator 5 is converted into DC power.

The power conversion apparatus 1 converts input DC power (hereinafter occasionally referred to as input power Pin) into AC power having a voltage that is based on the power system 3. Then, the power conversion apparatus 1 outputs the AC power to the power system 3. The power conversion apparatus 1 includes a power converter 10, a voltage detector 11, and a controller 20.

In this embodiment, the power converter 10 is made up of a plurality of switching elements that are connected to each other in a three-phase bridge configuration. The voltage detector 11 detects an instantaneous value of the DC voltage, Vdcin, input into the power converter 10 from the electric generation apparatus 2 (this instantaneous value will be hereinafter referred to as DC voltage Vdcin).

The controller 20 controls the power converter 10 based on the DC voltage Vdcin. In this manner, the power converter 10 converts the DC power input from the electric generation apparatus 2 into AC power. Then, the power converter 10 outputs the AC power to the power system 3.

The controller 20 includes a determiner 21 and a drive controller 22. A correlation is set in advance between levels of the DC voltage Vdcin and levels of effective power command Po* (which is a non-limiting example of the output power command recited in the appended claims). Based on the correlation, the determiner 21 determines an effective power command Po* that has a level correlated with the level of the DC voltage Vdcin detected by the voltage detector 11.

In this embodiment, the determiner 21 uses a conversion table or a conversion equation that is set in advance based on an output characteristic(s) of the electric generation apparatus 2 so as to determine an effective power command Po* that has a level correlated with the level of the DC voltage Vdcin. Based on the effective power command Po* determined by the determiner 21, the drive controller 22 controls the power converter 10 to output to the power system 3 AC power that is based on the effective power command Po*.

When the voltage amplitude of the power system 3 is constant, the effective power command Po* has a value proportional to effective current command Iout* (a non-limiting example of the output current command recited in the appended claims). In this case, the power converter 10 outputs to the power system 3 effective power that is based on the effective current command Iout*. That is to say, when the voltage amplitude of the power system 3 is constant, a correlation between levels of the DC voltage Vdcin and levels of the effective current command Iout* can be set in advance based on an output characteristic(s) of the electric generation apparatus 2 (this correlation will be hereinafter occasionally referred to as voltage-current correlation). In this case, based on the voltage-current correlation set in advance based on an output characteristic(s) of the electric generation apparatus 2, the determiner 21 is able to determine an effective current command Iout* that has a level correlated with the level of the DC voltage Vdcin detected by the voltage detector 11.

Thus, levels of the effective power command Po* or levels of the effective current command Iout* are correlated in advance with levels of the DC voltage Vdcin. This configuration ensures improved efficiency in controlling the input power Pin by the power conversion apparatus 1. The DC voltage Vdcin varies depending on the rotational speed of the electric generator 5, and accordingly, maximum power that can be output from the electric generation apparatus 2 varies depending on the rotational speed of the electric generator 5. In view of this situation, it is possible to maximize the input power Pin in setting in advance the correlation between levels of the DC voltage Vdcin and levels of the effective power command Po* or levels of the effective current command Iout*, based on an output characteristic(s) of the electric generation apparatus 2. This configuration ensures improved efficiency in obtaining from the DC voltage Vdcin an effective power command Po* or an effective current command Iout* that ensures control with maximized efficiency. The above configuration also ensures improved efficiency in performing MPPT control even if major changes occur in the amount of air input into the windmill 4 or in other extrinsic factors that can affect the amount of power generation.

The DC current, Idcin, input into the power converter 10 from the electric generation apparatus 2 does not change actively in response to a change in the state of the electric generation apparatus 2. This makes it difficult to perform control to, for example, maximize the input power Pin. In contrast, the DC voltage Vdcin varies depending on the rotational speed of the electric generator 5. This configuration makes it easier and more efficient, than with the DC current Idcin, to perform control to, for example, maximize the input power Pin.

In this embodiment, the electric generation apparatus 2 converts AC power resulting from wind power generation and output from the electric generator 5 into DC power, and then outputs the DC power. This configuration, however, is not intended as limiting the electric generation apparatus 2. In another possible embodiment, the electric generation apparatus 2 may be a DC electric generator that generates DC power. A non-limiting example of the DC electric generator is a solar cell. This configuration, similarly to the case of wind power generation, ensures improved efficiency in performing control (for example, MPPT control) of the power input from the electric generation apparatus 2 even if major changes occur in the amount of radiation to the solar cell or in other extrinsic factors that can affect the amount of power generation.

2. Exemplary Configuration of Power Conversion Apparatus 1

Figure 2:
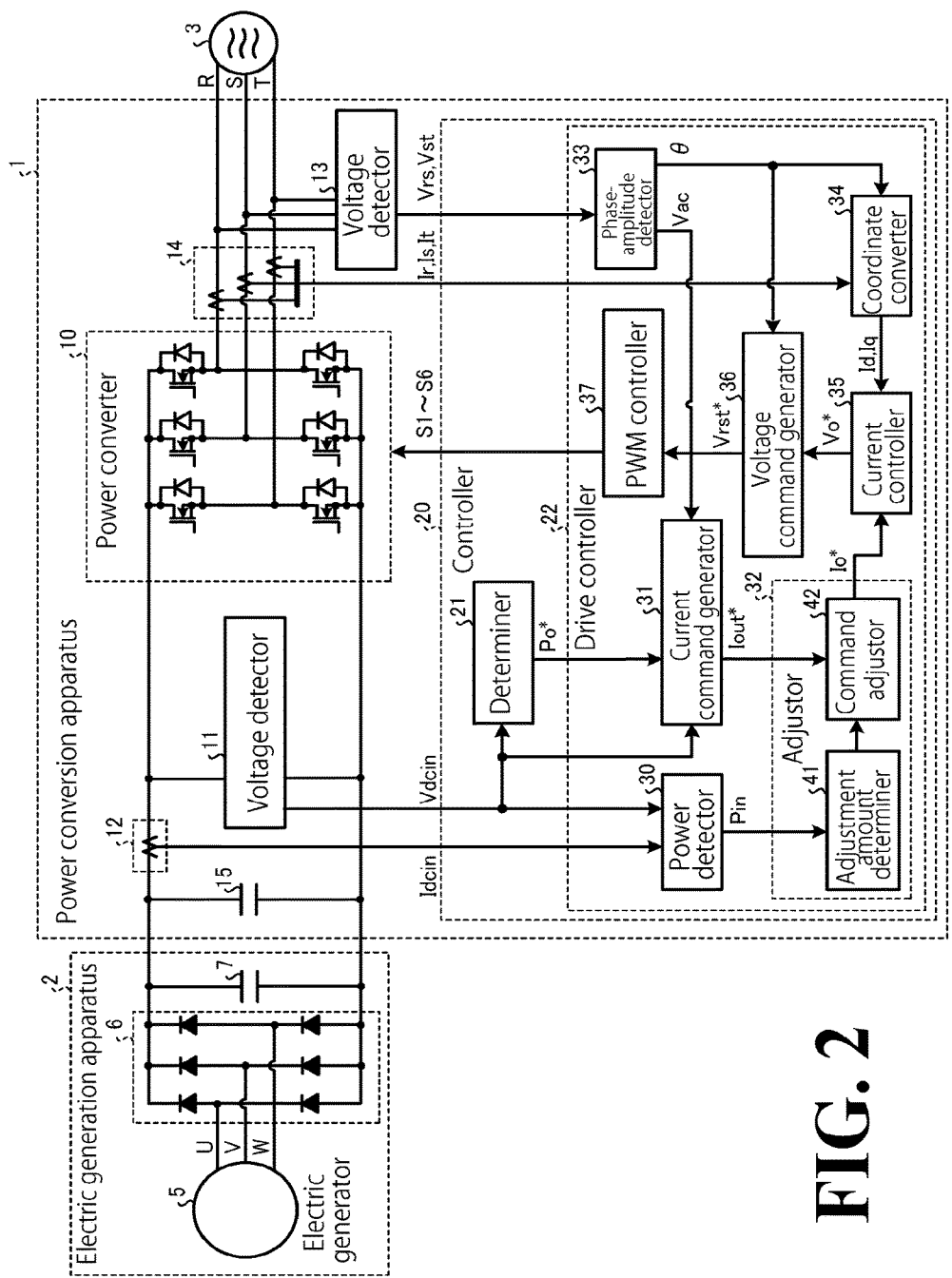
FIG. 2 is a diagram illustrating an exemplary configuration of a power conversion apparatus according to the embodiment.

FIG. 2 is a diagram illustrating an exemplary configuration of the power conversion apparatus 1. As illustrated in FIG. 2, the power conversion apparatus 1 includes the power converter 10, the voltage detector 11, a voltage detector 13, a current detector 12, a current detector 14, a capacitor 15, and the controller 20.

The power converter 10 is made up of a plurality of switching elements that are connected to each other in a three-phase bridge configuration. The power converter 10 will not be limited to the configuration illustrated in FIG. 2. Any other configuration is possible insofar as the power converter 10 is capable of converting DC power into AC power.

As described above, the voltage detector 11 detects the DC voltage Vdcin. When the voltage input into the power converter 10 from the electric generation apparatus 2 contains an AC component, the voltage detector 11 may remove the AC component using, for example, a lowpass filter before detecting the DC voltage Vdcin.

The current detector 12 detects an instantaneous value of the DC current Idcin, which is input into the power converter 10 from the electric generation apparatus 2 (this instantaneous value will be hereinafter referred to as DC current Idcin). When the current input into the power converter 10 from the electric generation apparatus 2 contains an AC component, the current detector 12 may remove the AC component using, for example, a lowpass filter before detecting the DC current Idcin.

The voltage detector 13 detects an instantaneous value of the three-phase AC voltage, Vrst, of the power system 3 (this instantaneous value will be hereinafter referred to as system voltage Vrst). In order to detect the system voltage Vrst, the voltage detector 13 may detect, for example, instantaneous values of inter-line voltages Vrs and Vst of the power system 3 (these instantaneous values will be hereinafter referred to as inter-line voltages Vrs and Vst). The inter-line voltage Vrs is an inter-line voltage between the R phase and the S phase of the power system 3. The inter-line voltage Vst is an inter-line voltage between the S phase and the T phase of the power system 3.

The current detector 14 is disposed between the power converter 10 and the power system 3 to detect instantaneous values Ir, Is, and It of currents flowing on the R phase, the S phase, and the T phase between the power converter 10 and the power system 3 (these instantaneous values will be hereinafter referred to as system currents Ir, Is, and It). In this embodiment, the current detector 14 detects the currents using a Hall element, which is a magnetoelectric conversion device.

The controller 20 includes a microcomputer and various circuits. The microcomputer includes a central processing unit (CPU), a read only memory (ROM), a random access memory (RAM), and input-output ports. The CPU of the microcomputer reads a program stored in the ROM and executes the program to implement the control described later.

The controller 20 includes the determiner 21 and the drive controller 22. In this embodiment, the functions of the determiner 21 and the drive controller 22 are implemented by the above-described CPU when the CPU reads and executes the program. The determiner 21 and the drive controller 22 may be partially or entirely implemented by hardware such as Application Specific Integrated Circuit (ASIC) and Field Programmable Gate Array ($FP_GA$). A configuration of the controller 20 will be described in more detail below.

2. 1. Determiner 21

In the determiner 21, a correlation is set in advance between levels of the DC voltage Vdcin and levels of the effective power command Po* based on an output characteristic(s) of the electric generation apparatus 2 (this correlation will be hereinafter occasionally referred to as voltage-power correlation). In this embodiment, the voltage-power correlation is set in a storage section of the determiner 21 in the form of a conversion table or a conversion equation. Based on the conversion table or the conversion equation, the determiner 21 determines an effective power command Po* that has a level correlated with the level of the DC voltage Vdcin detected by the voltage detector 11.

Figure 3:
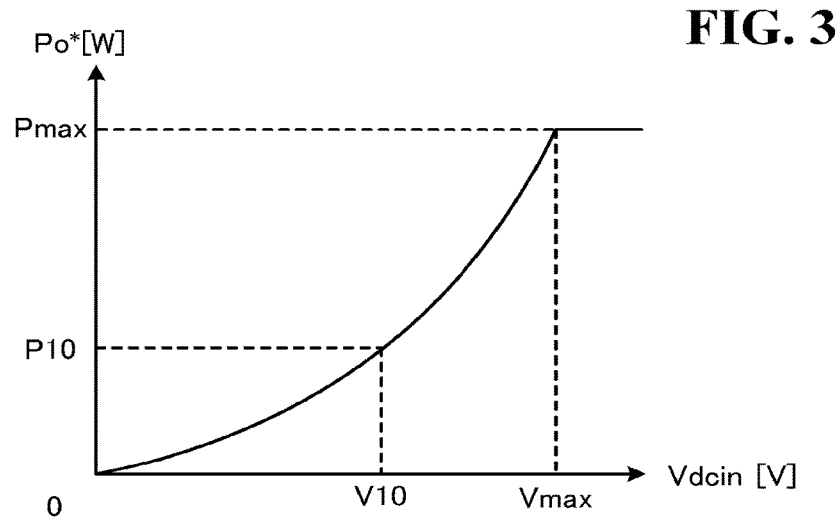
FIG. 3 is a graph illustrating levels of DC voltage correlated in advance with levels of effective power command.

FIG. 3 is a graph illustrating an example of the voltage-power correlation. The horizontal axis of the graph illustrated in FIG. 3 denotes the DC voltage Vdcin, and the vertical axis of the graph illustrated in FIG. 3 denotes the effective power command Po*. Based on a conversion table or a conversion equation indicating in advance the voltage-power correlation illustrated in FIG. 3, the determiner 21 is capable of determining an effective power command Po* that has a level correlated with the level of the DC voltage Vdcin.

In the embodiment illustrated in FIG. 3, when Vdcin=V10, the determiner 21 determines that Po*=P10. This configuration ensures improved efficiency in controlling the electric generator 5 even if, for example, it is impossible or difficult to directly monitor the AC voltage or the AC current output from the electric generator 5 or directly monitor the rotational speed of the electric generator 5. In the embodiment illustrated in FIG. 3, when the DC voltage Vdcin is at or above its maximum Vmax, the level of the effective power command Po* is at its maximum Pmax. This configuration prevents the power converter 10 from outputting an excessive amount of power beyond rated power.

The input power Pin is maximized in setting in advance the correlation between levels of the DC voltage Vdcin and levels of the effective power command Po*, based on an output characteristic(s) of the electric generation apparatus 2. This configuration enables the determiner 21 to determine an effective power command Po* having a level that maximizes the input power Pin.

The conversion table or the conversion equation set in the determiner 21 can be set using an input section (not illustrated) of the power conversion apparatus 1. This configuration ensures that an output characteristic(s) of the electric generation apparatus 2, which is connected with the power conversion apparatus 1, can be used as a basis for setting the conversion table or the conversion equation. Even if the electric generation apparatus 2 has a different output characteristic, the electric generation apparatus 2 is controlled with improved accuracy.

The conversion table correlates an individual level of the DC voltage Vdcin with an individual level of the effective power command Po*. A non-limiting example of the conversion equation is an arithmetic equation that represents a correlation between the level of the DC voltage Vdcin and the effective power command Po*. Another non-limiting example of the conversion equation is an approximation of a correlation between the level of the DC voltage Vdcin and the effective power command Po*.

Another possible embodiment is to prepare in advance a plurality of kinds of conversion tables or conversion equations in the determiner 21 and to select, using the input section (not illustrated) of the power conversion apparatus 1, one conversion table or one conversion equation from among the plurality of kinds of conversion tables or conversion equations. This configuration facilitates the setting of a conversion table or a conversion equation that is based on an output characteristic(s) of the electric generation apparatus 2. When the result of detection performed by the voltage detector 11 contains an AC component, the determiner 21 may remove the AC component using, for example, a lowpass filter and determine an effective power command Po* based on the DC voltage Vdcin without the AC component.

When the voltage amplitude of the power system 3 is constant, a current command generator 31 may not necessarily be provided in the controller 20, and the determiner 21 may output the effective current command Iout* (=Po*/Vac). In this case, the correlation (voltage-current correlation) that is set between levels of the DC voltage Vdcin and levels of the effective current command Iout* based on an output characteristic(s) of the electric generation apparatus 2 is set in advance in the storage section in the determiner 21 in the form of a conversion table or a conversion equation. Based on the conversion table or the conversion equation, the determiner 21 determines an effective current command Iout* that has a level correlated with the level of the DC voltage Vdcin detected by the voltage detector 11.

2. 2. Drive Controller 22

Based on the effective power command Po* or the effective current command Iout* determined by the determiner 21, the drive controller 22 controls the power converter 10 to output to the power system 3 AC power that is based on the effective power command Po* or the effective current command Iout*.

The drive controller 22 includes a power detector 30, the current command generator 31, an adjustor 32, a phase-amplitude detector 33, a coordinate converter 34, a current controller 35, a voltage command generator 36, and a PWM controller 37.

Based on the DC voltage Vdcin detected by the voltage detector 11 and based on the DC current Idcin detected by the current detector 12, the power detector 30 detects the input power Pin, which is DC power input into the power conversion apparatus 1 from the electric generation apparatus 2.

The power detector 30 performs an arithmetic operation represented by, for example, Formula (1) to detect the input power Pin. When the result of detection performed by the voltage detector 11 and/or the result of detection performed by the current detector 12 contain an AC component, it is possible to remove the AC component using a lowpass filter and then perform an arithmetic operation represented by Formula (1) to detect the input power Pin.

$$Pin = Vdcin \times Idcin \quad (1)$$

The current command generator 31 generates the effective current command Iout* based on the effective power command Po* determined by the determiner 21 and based on the voltage amplitude, Vac, of the power system 3 detected by the phase-amplitude detector 33 (this voltage amplitude will be hereinafter referred to as system voltage Vac). The output of the power conversion apparatus 1 is controlled by the effective current command Iout*.

The current command generator 31 performs an arithmetic operation represented by, for example, Formula (2) to generate the effective current command Iout*. When the system voltage Vac detected by the phase-amplitude detector 33 contains an AC component, it is possible to remove the AC component using a lowpass filter and then perform an arithmetic operation represented by Formula (2) to generate the effective current command Iout*.

$$Iout^* = Po^*/Vac \quad (2)$$

The current command generator 31 sets the level of the effective current command Iout* at zero until the input voltage, Vdcin, of the current command generator 31 becomes equal to or higher than a predetermined voltage Va. When input voltage Vdcin becomes equal to or higher than the predetermined voltage Va, the current command generator 31 gradually increases the effective current command Iout* to end up at the value obtained by the arithmetic operation represented by Formula (2), causing power conversion to start. When the input voltage Vdcin becomes equal to or less than a predetermined voltage Vb (<Va), the current command generator 31 sets the effective current command Iout* at zero, causing the power conversion to stop.

This configuration stabilizes the power conversion operation when the input voltage Vdcin is relatively low. A non-limiting example of the predetermined voltage Va is that the input power Pin is set at a voltage in excess of power consumed in the power converter 10. A non-limiting example of the predetermined voltage Vb is that the input power Pin is set at a voltage at which power conversion state cannot be maintained. While the predetermined voltage Vb may be the same as the predetermined voltage Va, making the predetermined voltage Vb different from the predetermined voltage Va makes the power conversion operation more stable when the input voltage Vdcin is relatively low.

The adjustor 32 performs MPPT (Maximum Power Point Tracking) control by adjusting the effective current command Iout* to maximize the input power Pin detected by the power detector 30. When the determiner 21 determines the effective current command Iout*, the adjustor 32 adjusts the effective current command Iout* determined by the determiner 21. In this case, the current command generator 31 may not necessarily be provided.

This configuration ensures that the effective current command Iout* is adjusted to maximize the input power Pin even if, for example, a discrepancy occurs between the voltage-power correlation or the voltage-power correlation set in advance and an actual correlation due to a change in an output characteristic(s) of the electric generation apparatus 2 or due to a change in the external environment. That is, the above configuration improves the accuracy of MPPT control. In the following description, the effective current command Iout* that has undergone the adjustment performed by the adjustor 32 will be hereinafter occasionally referred to as effective current command Io*.

In this embodiment, the adjustor 32 includes an adjustment amount determiner 41 and a command adjustor 42. The adjustment amount determiner 41 determines an adjustment amount to maximize the input power Pin detected by the power detector 30. The command adjustor 42 adjusts the effective current command Iout* based on the adjustment amount determined by the adjustment amount determiner 41. This configuration improves the accuracy of MPPT control.

From the inter-line voltages Vrs and Vst, the phase-amplitude detector 33 detects the voltage phase, θ, of the power system 3 (this voltage phase will be hereinafter referred to as system phase θ) and the system voltage Vac. For example, the phase-amplitude detector 33 converts each of the inter-line voltages Vrs and Vst into α-axis voltage Vα and β-axis voltage Vβ, which are αβ components of two mutually orthogonal axes on a fixed coordinate system.

The phase-amplitude detector 33 obtains the system voltage Vac by, for example, calculating the average of the sums of squares of the α-axis voltage Vα and the β-axis voltage Vβ. Also, the phase-amplitude detector 33 obtains the system phase θ by, for example, converting each of the α-axis voltage Vα and the β-axis voltage Vβ into a d-axis component Vd and a q-axis component Vq on a d-q axis coordinate system and by making the d-axis component Vd zero. This configuration, however, is not intended as limiting the phase-amplitude detector 33. Any other configuration is possible insofar as the phase-amplitude detector 33 is capable of detecting the system phase θ and the system voltage Vac.

Based on the system phase θ detected by the phase-amplitude detector 33, the coordinate converter 34 converts each of the system currents Ir, Is, and It detected by the current detector 14 into components on a d-q axis coordinate system. In this manner, the coordinate converter 34 obtains a d-axis current Id and a q-axis current Ig. The d-axis current Id is a reactive current component, and the q-axis current Iq is an effective current component.

The current controller 35 generates the voltage command Vo* based on the effective current command Io*, the d-axis current Id, and the q-axis current Iq. For example, the current controller 35 performs PI (proportional integration) control to make the difference between the effective current command Io* and the q-axis current Iq zero so as to generate a q-axis component of the voltage command Vo*, namely, a q-axis voltage command Vq*. Also, the current controller 35 performs PI control to make the d-axis current Id zero so as to generate a d-axis component of the voltage command Vo*, namely, a d-axis voltage command Vd*.

The voltage command generator 36 generates a three-phase AC voltage command Vrst* from the q-axis voltage command Vq* and the d-axis voltage command Vd*, which are voltage commands on a d-q system coordinate system. The three-phase AC voltage command Vrst* includes an R-phase voltage command Vr*, an S-phase voltage command Vs*, and a T-phase voltage command Vt*.

The PWM controller 37 generates PWM signals S1 to S6 based on the R-phase voltage command Vr*, the S-phase voltage command Vs*, and the T-phase voltage command Vt*, and outputs the PWM signals S1 to S6 to the power converter 10. In response to the PWM signals S1 to S6, the power converter 10 outputs an R-phase voltage Vr, an S-phase voltage Vs, and a T-phase voltage Vt, which are respectively based on the R-phase voltage command Vr*, the S-phase voltage command Vs*, and the T-phase voltage command Vt*, causing an effective current based on the effective current command Io* to be output to the power system 3.

2. 3. Adjustor 32

As described above, the adjustor 32 includes the adjustment amount determiner 41 and the command adjustor 42, and adjusts the effective current command Io* to maximize the input power Pin detected by the power detector 30.

Figure 4:
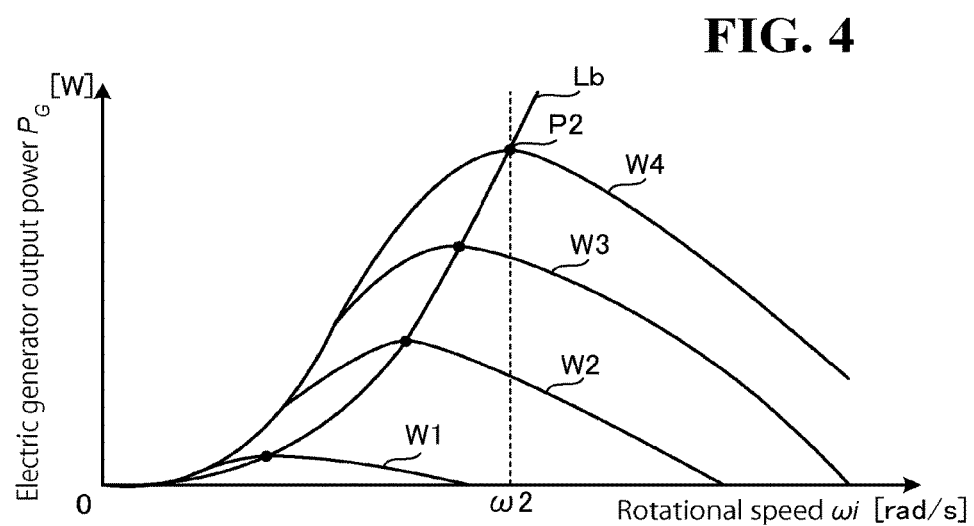
FIG. 4 is a graph illustrating output characteristics of an electric generator in relation to certain input amounts.

Description will be made with regard to a relation between the output power, $P_G$, of the electric generator 5 (this output power will be hereinafter occasionally referred to as electric generator output power $P_G$) and the rotational speed, ωi, of the electric generator 5 (this rotational speed will be hereinafter occasionally referred to as generator rotational speed ωi). This relation will be hereinafter referred to as an output characteristic(s) of the electric generation apparatus 2. FIG. 4 is a graph illustrating output characteristics of the electric generation apparatus 2 in relation to input amounts W1 to W4. The horizontal axis of the graph illustrated in FIG. 4 denotes electrical-machine rotational speed ωi. The vertical axis of the graph illustrated in FIG. 4 denotes the electric generator output power $P_G$. The input amounts W1 to W4 are amounts of air input into the windmill 4. In the example illustrated in FIG. 4, these input amounts are in the relationship: W4>W3>W2>W1. The amounts of air input into the windmill 4 correspond to the level of wind energy input into the windmill 4, varying depending on wind speed and wind direction, for example.

As illustrated in FIG. 4, even if the input amount W is constant, the electric generator output power $P_G$ varies depending on the generator rotational speed ωi. Also as illustrated in FIG. 4, controlling the generator rotational speed ωi to maximize the electric generator output power $P_G$ enables maximum power corresponding to the input amount W to be obtained from the electric generation apparatus 2.

For example, when the input amount W of the electric generation apparatus 2 is W4, controlling the electric generator 5 to make the generator rotational speed ωi speed ω2 enables maximum power P2, which corresponds to the input amount W4, to be obtained from the electric generation apparatus 2. As illustrated in FIG. 4, line Lb is a maximum-efficiency driving curve plotting the maximum power points of the input amounts W1 to W4.

The input power Pin is input into the power conversion apparatus 1 through the rectifier 6. This necessitates a detector in the power conversion apparatus 1 to directly detect the AC voltage and/or the AC current output from the electric generator 5 and/or to directly detect the number of rotations of the electric generator 5. If no such detector is provided in the power conversion apparatus 1, it is difficult to perform direct feedback control with respect to the AC voltage and/or the AC current output from the electric generator 5 and/or with respect to the number of rotations of the electric generator 5.

Figure 5:
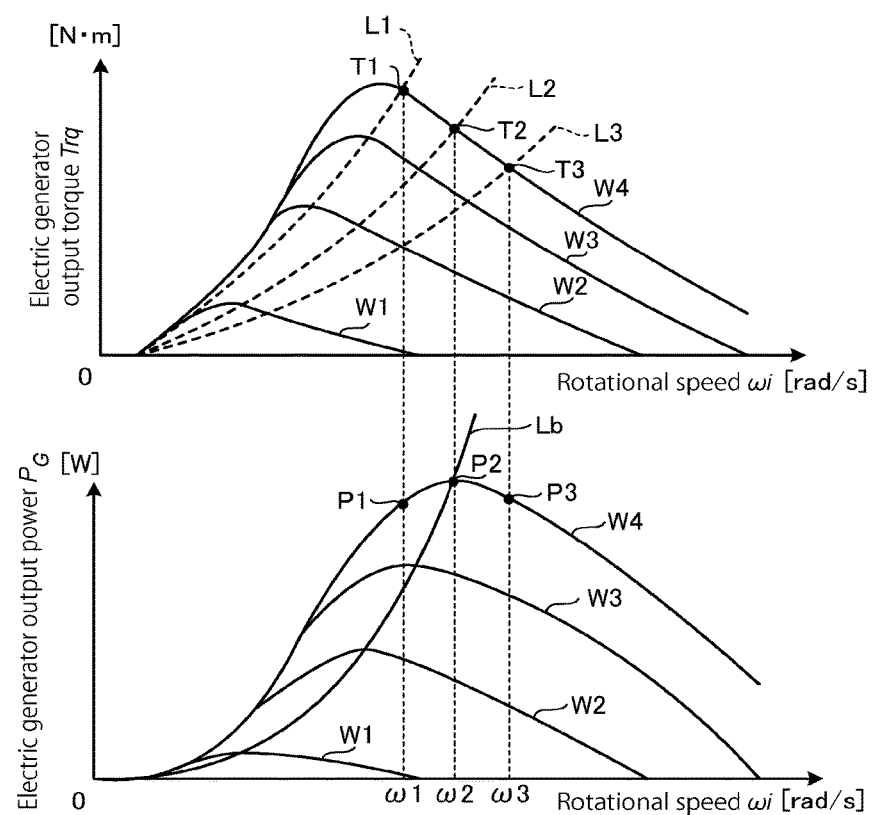
FIG. 5 is a graph illustrating a relationship between the output torque of the electric generator, the output power of the electric generator, and the rotational speed of the electric generator.

In view of this situation, the controller 20 controls the electric generation apparatus 2 based on the DC voltage Vdcin and/or the DC current Idcin input into the controller 20. FIG. 5 is a graph illustrating a relationship between the output torque, Trq, of the electric generator 5 (this output torque will be hereinafter occasionally referred to as electric generator torque Trq), the electric generator output power $P_G$, and the generator rotational speed ωi. The horizontal axis of the graph illustrated in FIG. 5 denotes the generator rotational speed ωi. The vertical axis of the upper part of the graph illustrated in FIG. 5 denotes the electric generator torque Trq. The vertical axis of the lower part of the graph illustrated in FIG. 5 denotes the electric generator output power $P_G$.

The generator rotational speed ωi and the DC voltage Vdcin are correlated with each other. Hence, the voltage-power correlation used to perform MPPT control can be derived from optimal curve L2 illustrated in FIG. 5. In view of this situation, the voltage-power correlation or the voltage-current correlation used to perform MPPT control is set in advance in the determiner 21 of the controller 20 based on an output characteristic(s) of the electric generation apparatus 2.

Incidentally, a discrepancy may occur between the voltage-power correlation or the voltage-current correlation set in advance in the determiner 21 and an actual correlation. The discrepancy may make it impossible or difficult to perform MPPT control with accuracy.

For example, when W=W4 and ωi=ω2, then $P_G$=P2, making maximum power obtained from the electric generation apparatus 2. If an discrepancy occurs between the voltage-power correlation or the voltage-current correlation set in advance and the actual correlation causing, for example, ωi=ω1 or ωi=ω3, it may be difficult to obtain maximum power from the electric generation apparatus 2 with accuracy.

In view of this situation, the adjustor 32 adjusts the effective current command Iout* generated by the current command generator 31 or the effective current command Iout* determined by the determiner 21 to maximize the input power Pin detected by the power detector 30.

For example, when the effective current command Iout* is increased while the electric generator 5 is driving according to operation curve L3 illustrated in FIG. 5, which is when the effective current command Iout* is smaller than its optimal value, the input power Pin increases until the operation curve reaches operation curve L2, which is the optimal curve. In this case, the command adjustor 42 increases the effective current command Iout* (pattern A, described later). When the effective current command Iout* is decreased while the electric generator 5 is driving according to the operation curve L3, the operation curve becomes lower than the operation curve L3. In this case, the command adjustor 42 increases the effective current command Iout* (pattern B, described later).

When the effective current command Iout* is decreased while the electric generator 5 is driving according to operation curve L1 illustrated in FIG. 5, which is when the effective current command Iout* is larger than its optimal value, the input power Pin increases until the operation curve reaches the operation curve L2. In this case, the command adjustor 42 decreases the effective current command Iout* (pattern C, described later). When the effective current command Iout* is increased while the electric generator 5 is driving according to the operation curve L1, the operation curve becomes higher than the operation curve L1. In this case, the command adjustor 42 decreases the effective current command Iout* (pattern D, described later).

Figure 6:
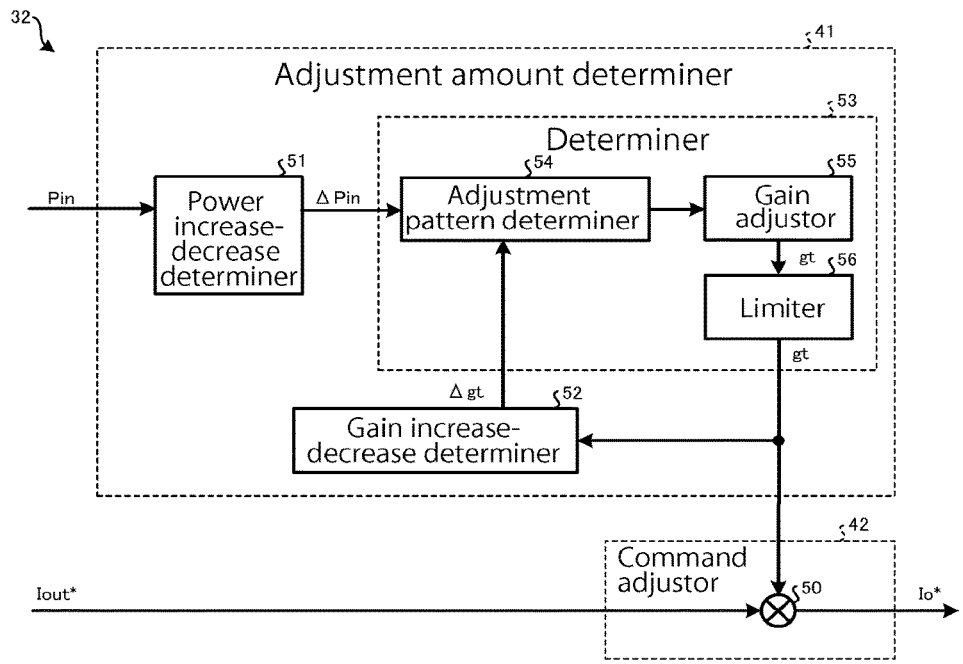
FIG. 6 is a diagram illustrating an exemplary configuration of an adjustor.

FIG. 6 is a diagram illustrating an exemplary configuration of the adjustor 32. As illustrated in FIG. 6, the adjustment amount determiner 41 a power increase-decrease determiner 51, a gain increase-decrease determiner 52, and a determiner 53. With this configuration, the adjustment amount determiner 41 determines adjustment gain gt (which is a non-limiting example of the adjustment amount recited in the appended claims) to maximize the input power Pin detected by the power detector 30.

The power increase-decrease determiner 51 determines an increase-decrease state of the input power Pin detected by the power detector 30. For example, assume that the input power Pin that has been currently detected by the power detector 30 will be referred to as Pin(n), and the input power Pin that was last detected by the power detector 30 will be referred to as Pin(n−1).

In this case, the power increase-decrease determiner 51 performs an arithmetic operation represented by, for example, Formula (3) to obtain the amount of change, ΔPin(n), in the input power Pin. The amount of change ΔPin(n) in the input power Pin will be hereinafter occasionally referred to as input change amount ΔPin(n) or input change amount ΔPin.

$$\Delta Pin(n)=Pin(n)-Pin(n-1) \qquad (3)$$

A nonlimiting example of the power increase-decrease determiner 51 includes a delayer and a subtractor. The delayer delays Pin(n−1) and outputs the delayed Pin(n−1). The subtractor subtracts Pin(n−1) from Pin(n) to obtain the input change amount ΔPin(n).

The gain increase-decrease determiner 52 determines an increase-decrease state of the adjustment gain gt. For example, the adjustment gain gt that was last detected by the determiner 53 will be referred to as gt(n−1), and the adjustment gain gt detected by the determiner 53 last time but one will be referred to as gt(n−2).

In this case, the gain increase-decrease determiner 52 performs an arithmetic operation represented by, for example, Formula (4) to obtain the amount of change, Δgt(n−1), in the adjustment gain gt. The amount of change Δgt(n−1) in the adjustment gain gt will be hereinafter occasionally referred to as gain change amount of Δgt(n−1) or gain change amount Δgt.

$$\Delta gt(n-1)=gt(n-1)-gt(n-2) \qquad (4)$$

A non-limiting example of the gain increase-decrease determiner 52 includes a delayer and a subtractor. The delayer delays gt(n−2) and outputs the delayed gt(n−2). The subtractor subtracts gt(n−2) from gt(n−1) to obtain the gain change amount Δgt(n−1).

The determiner 53 determines the adjustment gain gt based on the input change amount ΔPin and the gain change amount Δgt. As illustrated, in FIG. 6, the determiner 53 includes an adjustment pattern determiner 54, a gain adjustor 55, and a limiter 56.

The adjustment pattern determiner 54 determines an adjustment pattern based on the input change amount ΔPin (n) and the gain change amount Δgt(n−1). For example, the adjustment pattern determiner 54 determines one of patterns A to D listed on Table 1 as the adjustment pattern.

TABLE 1

| Pattern | Input change | Gain change | How to adjust |
|---|---|---|---|
| A | ΔPin(n) ≥ 0 | Δgt(n − 1) ≥ 0 | Increase |
| B | ΔPin(n) < 0 | Δgt(n − 1) < 0 | Increase |
| C | ΔPin(n) ≥ 0 | Δgt(n − 1) < 0 | Decrease |
| D | ΔPin(n) < 0 | Δgt(n − 1) ≥ 0 | Decrease |

For example, when ΔPin(n)≥0 and Δgt(n−1)≥0, the adjustment pattern determiner 54 determines the pattern A as the adjustment pattern. When ΔPin(n)<0 and Δgt(n−1)<0, the adjustment pattern determiner 54 determines the pattern B as the adjustment pattern.

When ΔPin(n)≥0 and Δgt(n−1)<0, the adjustment pattern determiner 54 determines the pattern C as the adjustment pattern. When ΔPin(n)<0 and Δgt(n−1)≥0, the adjustment pattern determiner 54 determines the pattern D as the adjustment pattern.

The gain adjustor 55 adjusts adjustment gain gt(n) based on the adjustment pattern determined by the adjustment pattern determiner 54. For example, when the adjustment pattern determined by the adjustment pattern determiner 54 is the pattern A or B, the gain adjustor 55 makes the present adjustment gain gt(n) larger than the last adjustment gain gt(n−1).

When the adjustment pattern determined by the adjustment pattern determiner 54 is the pattern A or B, the gain adjustor 55 performs an arithmetic operation represented by, for example, Formula (5) to obtain the present adjustment gain gt(n). In Formula (5), a fixed adjustment value Δg is used. In another possible embodiment, a variable adjustment value Δg may be used.

$$gt(n)=gt(n-1)+\Delta g \qquad (5)$$

When the adjustment pattern determined by the adjustment pattern determiner 54 is the pattern C or D, the gain adjustor 55 makes the present adjustment gain gt(n) smaller than the last adjustment gain gt(n−1).

When the adjustment pattern determined by the adjustment pattern determiner 54 is the pattern C or D, the gain adjustor 55 performs an arithmetic operation represented by, for example, Formula (6) to obtain the present adjustment gain gt(n).

$$gt(n)=gt(n-1)-\Delta g \qquad (6)$$

The limiter 56 limits the adjustment gain gt within a predetermined limitation value range (for example, from 0.5 to 2.0). This configuration eliminates or minimizes an excessive amount of adjustment.

The command adjustor 42 includes a multiplier 50. The multiplier 50 performs an arithmetic operation represented by, for example, Formula (7) to multiply the present effective current command Iout*(n) by the adjustment gain gt(n), and regards the product as the effective current command Io*(n) and outputs the effective current command Io*(n). In the following description, the effective current command Io*(n) will be occasionally referred to as effective current command Io*.

$$Io^*(n)=Iout^*(n)\times gt(n) \qquad (7)$$

Thus, the adjustor 32 adjusts the effective current command Iout*(n) using the adjustment gain gt(n) and outputs the effective current command Io*(n). This configuration ensures that the amount of adjustment increases as the effective current command Iout* increases, making the MPPT control higher in speed.

Figure 7:
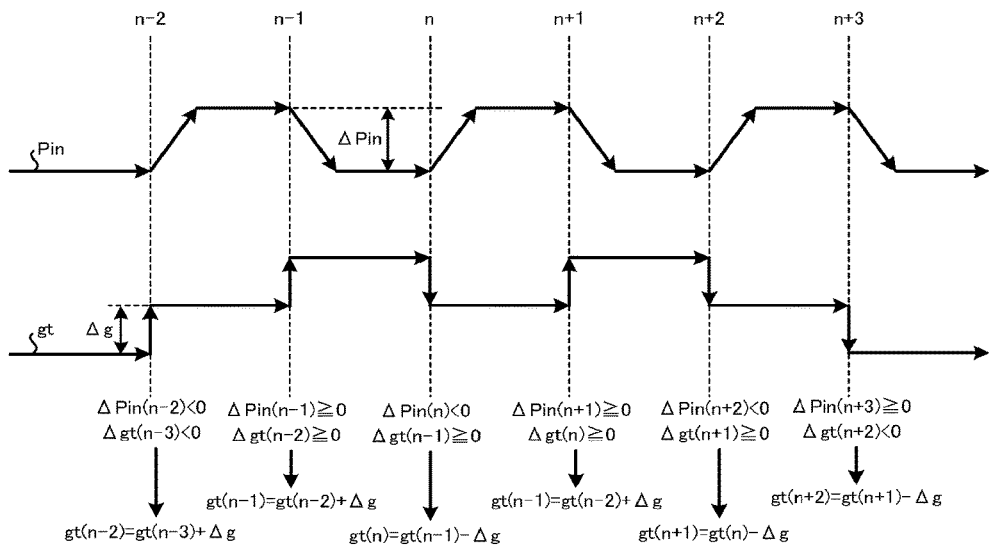
FIG. 7 illustrates a stable driving state of the electric generator and illustrates the amount of change in input power, the amount of change in adjustment gain, and state transition of the adjustment gain in the stable driving state.

FIG. 7 illustrates a stable driving state of the electric generator 5 driving in the vicinity of the operation curve L2 illustrated in FIG. 5, the input change amount ΔPin, the gain change amount Δgt, and state transition of the adjustment gain gt in the stable driving state. When the input amount W is stable, the DC voltage Vdcin is stable. Therefore, the effective current command Iout* is stable.

While the electric generator 5 is driving stably in the vicinity of the operation curve L2 illustrated in FIG. 5, the adjustor 32 increases or decreases the adjustment gain gt based on the gain change amount Δgt and the adjustment gain gt, as illustrated in FIG. 7. This configuration improves the accuracy of MPPT control.

Figure 8:
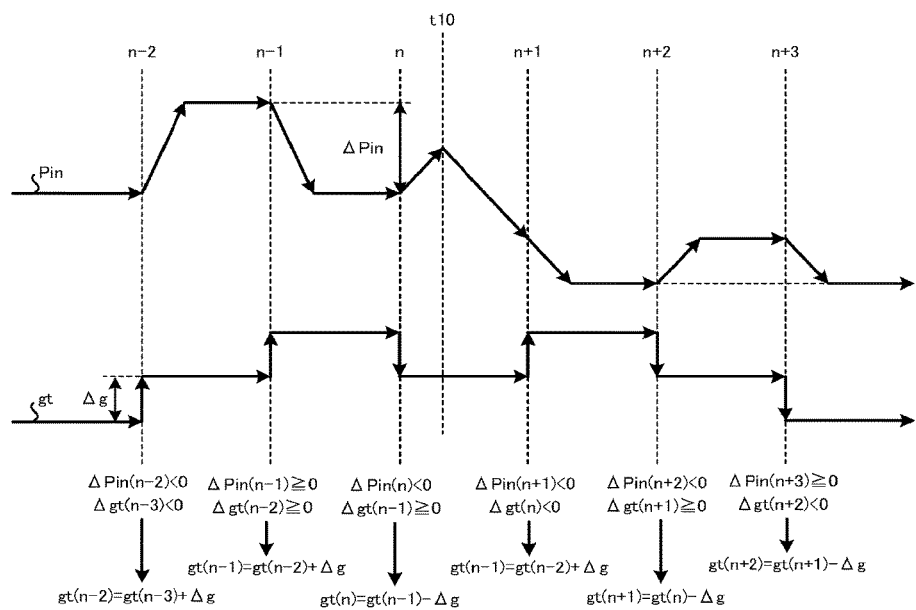
FIG. 8 illustrates a state in which the driving of the electric generator is going unstable due to a rapid decrease of the input amount, and illustrates the amount of change in input power, the amount of change in adjustment gain, and state transition of the adjustment gain in this state.

FIG. 8 illustrates a state in which the driving of the electric generator 5 is going unstable from the stable driving in the vicinity of the operation curve L2 illustrated in FIG. 5 due to a rapid decrease of the input amount W, and illustrates the input change amount ΔPin, the gain change amount Δgt, and state transition of the adjustment gain gt in this state.

When the input amount W decreases rapidly, the DC voltage Vdcin decreases. Then, the determiner 21 determines the effective power command Po* or the effective current command Iout*, which is based on the decreased DC voltage Vdcin. This makes the effective current command Iout* located in the vicinity of the operation curve L2. Additionally, the adjustor 32's increasing or decreasing the adjustment gain gt based on the gain change amount Δgt and the adjustment gain gt as illustrated in FIG. 8 improves the accuracy of MPPT control even if the input amount W decreases rapidly (such as at time t10).

Figure 9:
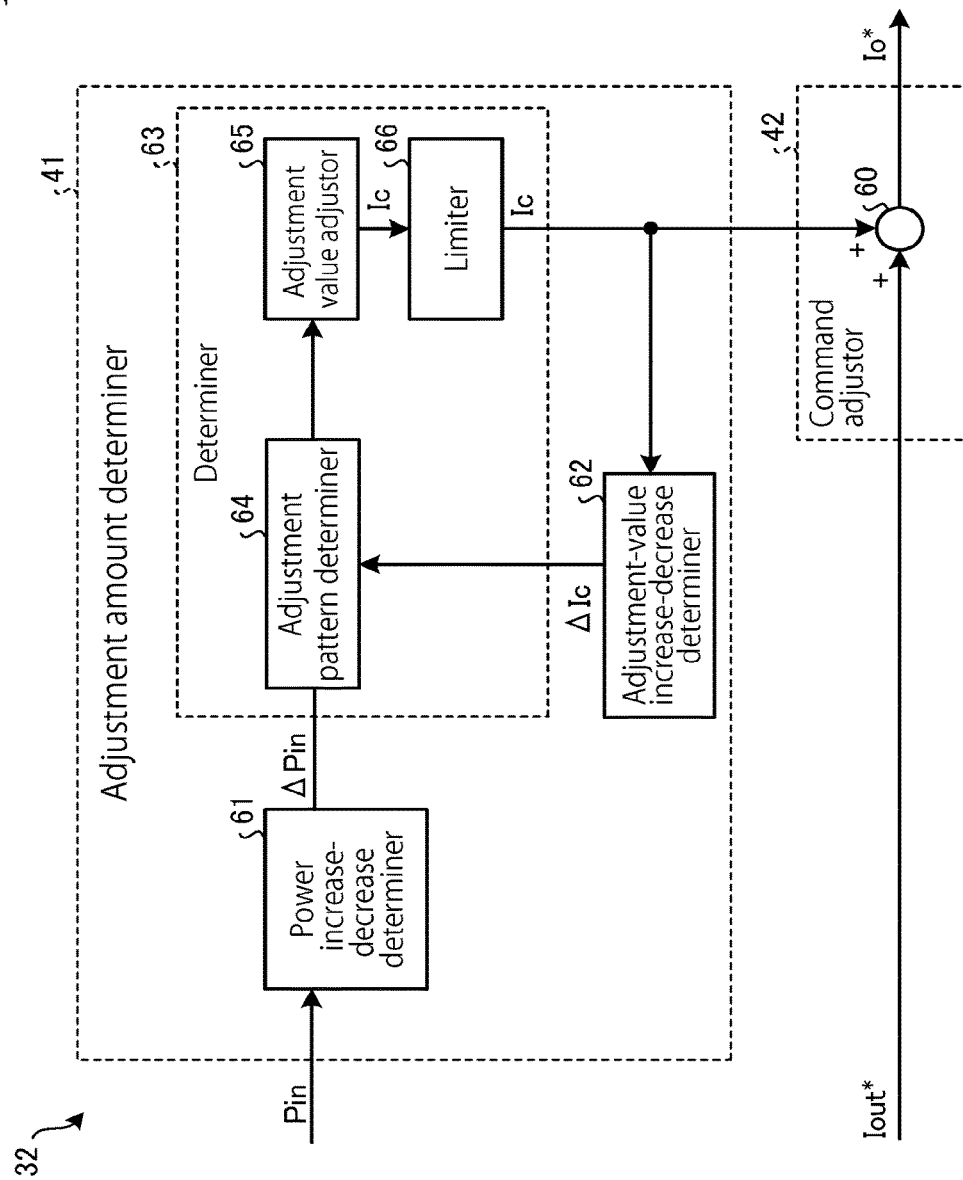
FIG. 9 is a diagram illustrating another exemplary configuration of the adjustor.

The configuration of the adjustor 32 illustrated in FIG. 6 is provided for exemplary purposes only; the adjustor 32 will not be limited to the configuration illustrated in FIG. 6. FIG. 9 is a diagram illustrating another exemplary configuration of the adjustor 32. The adjustor 32 according to the embodiment of FIG. 6 uses the adjustment gain gt as the adjustment amount by multiplying the effective current command Iout* by the adjustment gain gt. The adjustor 32 according to the embodiment of FIG. 9 uses the adjustment value Ic as the adjustment amount by adding the adjustment value Ic to the effective current command Iout*.

The adjustor 32 according to the embodiment of FIG. 9 includes the adjustment amount determiner 41 and the command adjustor 42. The command adjustor 42 includes an adder 60. The adjustment amount determiner 41 includes a power increase-decrease determiner 61, the adjustment-value increase-decrease determiner 62, and a determiner 63. The determiner 63 includes an adjustment pattern determiner 64, an adjustment value adjustor 65, and a limiter 66.

The power increase-decrease determiner 61 is similar to the adjustment amount determiner 41 illustrated in FIG. 6 in that the power increase-decrease determiner 61 determines the increase-decrease state of the input power Pin. For example, the power increase-decrease determiner 61 is capable of obtaining the input change amount ΔPin(n).

The adjustment-value increase-decrease determiner 62 determines an increase-decrease state of adjustment value Ic, instead of determining the increase-decrease state of the adjustment gain gt. For example, the adjustment-value increase-decrease determiner 62 performs an arithmetic operation represented by, for example, Formula (8) to obtain the amount of change, ΔIc(n−1), in the adjustment value Ic. The amount of change ΔIc(n−1) in the adjustment value Ic will be hereinafter occasionally referred to as adjustment-value change amount ΔIc(n−1) or adjustment-value change amount ΔIc.

$$\Delta Ic(n-1)=Ic(n-1)-Ic(n-2) \qquad (8)$$

The adjustment pattern determiner 64 determines the adjustment pattern based on the input change amount ΔPin(n) and the adjustment-value change amount ΔIc(n−1). For example, the adjustment pattern determiner 64 determines one of the patterns A to D listed on Table 1 as the adjustment pattern. In this case, the item Δgt(n−1) on Table 1 is replaced with the item ΔIc(n−1).

The adjustment value adjustor 65 adjusts adjustment value Ic(n) based on the adjustment pattern determined by the adjustment pattern determiner 64. When the adjustment pattern is the pattern A or B, the adjustment value adjustor 65 makes the present adjustment value Ic(n) larger than the last adjustment value Ic(n−1). When the adjustment pattern is the pattern C or D, the adjustment value adjustor 65 makes the present adjustment value Ic(n) smaller than the last adjustment value Ic(n−1).

For example, when the adjustment pattern is the pattern A or B, the adjustment value adjustor 65 performs an arithmetic operation represented by, for example, Formula (9) to obtain the present adjustment value Ic(n). When the adjustment pattern is the pattern C or D, the adjustment value adjustor 65 performs an arithmetic operation represented by, for example, Formula (10) to obtain the present adjustment value Ic(n). In Formula (9) and Formula (10), ΔI is a fixed value.

$$Ic(n)=Ic(n-1)+\Delta I \qquad (9)$$

$$Ic(n)=Ic(n-1)-\Delta I \qquad (10)$$

The limiter 66 limits the adjustment value Ic within a predetermined limitation value range. This configuration eliminates or minimizes an excessive amount of adjustment.

The adder 60 of the command adjustor 42 performs an arithmetic operation represented by, for example, Formula (11) to add the adjustment value Ic(n) to the present effective current command Iout*(n), and regards the sum as the effective current command Io*(n) and outputs the effective current command Io*(n).

$$Io^*(n)=Iout^*(n)+Ic(n) \qquad (11)$$

In increasing or decreasing the adjustment value Ic, the adjustment value adjustor 65 may not necessarily increase or decrease a fixed value; instead, it is possible to add or subtract the adjustment value ΔI, which varies depending on the input change amount ΔPin(n).

3. Processing by Controller 20

Figure 10:
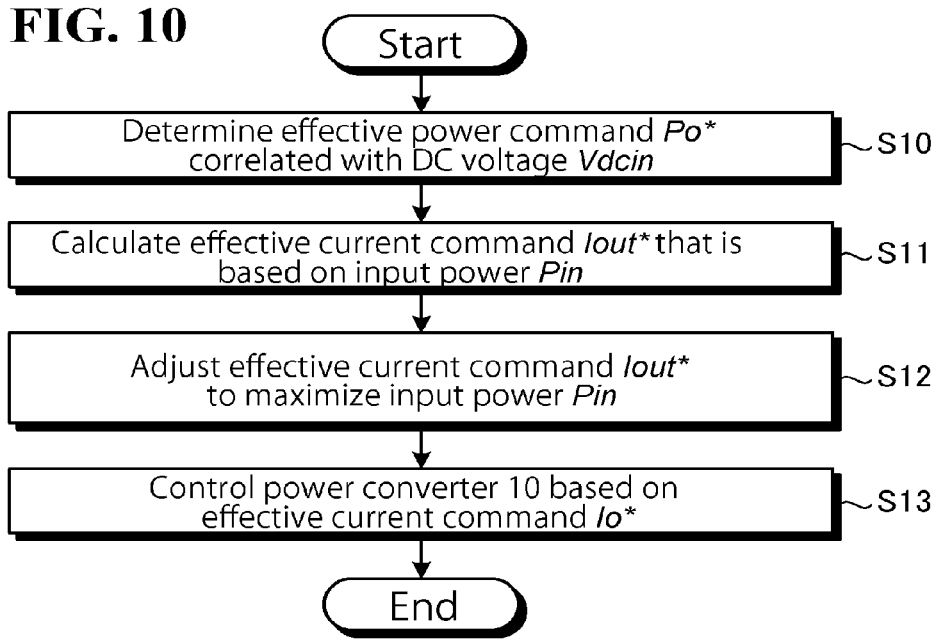
FIG. 10 is a flowchart of processing performed by a controller.

FIG. 10 is a flowchart of processing performed by the controller 20. The processing illustrated in FIG. 10 is repeated in this embodiment.

As illustrated in FIG. 10, based on the voltage-power correlation set in advance, the determiner 21 of the controller 20 determines an effective power command Po* that is correlated with the DC voltage Vdcin detected by the voltage detector 11 (step S10). Next, the drive controller 22 of the controller 20 detects the input power Pin and calculates an effective current command Iout* that is based on the input power Pin (step S11). In another possible embodiment, based on the voltage-current correlation set in advance, the determiner 21 may determine an effective current command Iout* that is correlated with the DC voltage Vdcin detected by the voltage detector 11. In this case, the processing at step S11 can be omitted.

Next, the adjustor 32 of the drive controller 22 adjusts the effective current command Iout* to maximize the input power Pin (step S12). The adjustor 32 also controls the power converter 10 to output to the power system 3 an output current that is based on the effective current command Io*, which is the adjusted effective current command Iout* (step S13).

Figure 11:
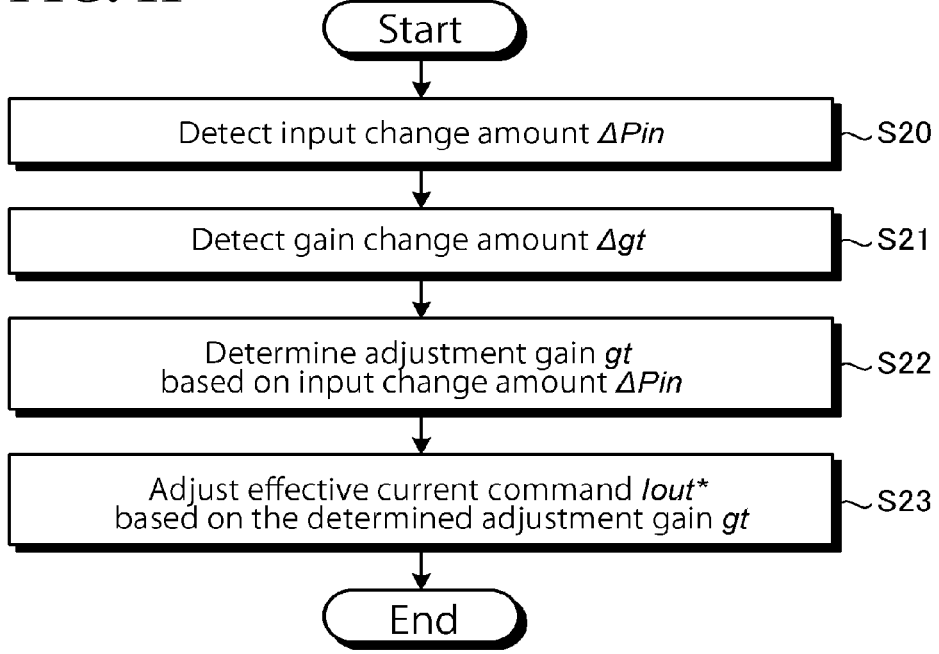
FIG. 11 is a flowchart of processing performed at step S12 illustrated in FIG. 10.

FIG. 11 is a flowchart of the processing performed at step S12 illustrated in FIG. 10. As illustrated in FIG. 11, the adjustor 32 of the drive controller 22 detects the input change amount ΔPin (step S20), and detects the gain change amount Δgt (step S21).

The adjustor 32 determines the adjustment gain gt based on the input change amount ΔPin and the gain change amount Δgt (step S22), and adjusts the effective current command Iout* based on the determined adjustment gain gt (step S23). In another possible embodiment, the adjustor 32 may detect the adjustment-value change amount ΔIc; determine the adjustment value Ic based on the input change amount ΔPin and the adjustment-value change amount ΔIc; and adjust the effective current command Iout* based on the determined adjustment value Ic.

As has been described hereinbefore, the power conversion apparatus 1 includes the power converter 10, the voltage detector 11, and the controller 20 (which is a non-limiting example of the controller recited in the appended claims). The power converter 10 converts DC power from the electric generation apparatus 2 into AC power. The voltage detector 11 detects the DC voltage Vdcin input into the power converter 10. The controller 20 includes the determiner 21 and the drive controller 22. The determiner 21 determines an effective power command Po* (which is a non-limiting example of the output power command recited in the appended claims) or an effective current command Iout* (which is a non-limiting example of the output current command recited in the appended claims) based on whether the effective power command Po* or the effective current command Iout* has a level correlated in advance with the level of the DC voltage Vdcin detected by the voltage detector 11. The drive controller 22 controls the power converter 10 based on the effective power command Po* or the effective current command Iout* determined by the determiner 21.

Thus, levels of the effective power command Po* or levels of the effective current command Iout* are correlated in advance with levels of the DC voltage Vdcin. This configuration improves efficiency in controlling the DC power input from the electric generation apparatus 2.

Also, based on a correlation set in advance between levels of the DC voltage Vdcin and levels of the effective power command Po* or levels of the effective current command Iout* based on an output characteristic(s) of the electric generation apparatus 2, the determiner 21 determines an effective power command Po* or an effective current command Iout* that has a level correlated with the level of the DC voltage Vdcin detected by the voltage detector 11. This configuration ensures that by, for example, setting in advance a correlation based on an output characteristic(s) of the electric generation apparatus 2 to maximize the DC power, an effective power command Po* or an effective current command Iout* that enables MPPT control to be performed is obtained more easily and more efficiently from the DC voltage Vdcin.

The drive controller 22 includes the power detector 30, the current command generator 31, the adjustor 32, and the current controller 35. The power detector 30 detects the input power Pin, which is DC power input into the power converter 10. The current command generator 31 generates the effective current command Iout* based on the effective power command Po* determined by the determiner 21. The adjustor 32 adjusts the effective current command Iout* to maximize the input power Pin detected by the power detector 30. The current controller 35 controls the power converter 10 to output an AC current that is based on the effective current command Iout* adjusted by the adjustor 32. This configuration improves the accuracy of MPPT control even if a discrepancy occurs between the voltage-power correlation set in advance and an actual correlation. When the voltage-power correlation is set in advance to maximize the DC power, electric generator torque Trq that is based on the effective current command Iout* is located in the vicinity of the optimal curve (for example, the optimal curve L2 illustrated in FIG. 5). This configuration ensures that the electric generator torque Trq that is based on the effective current command Iout* is located in a region where, as illustrated in FIG. 5, increase of the electric generator torque Trq causes the generator rotational speed ωi to decrease, and decrease of the electric generator torque Trq causes the generator rotational speed ωi to increase. This configuration improves accuracy in controlling the electric generator 5 even if it is impossible or difficult to directly monitor the AC voltage or the AC current output from the electric generator 5 or directly monitor the rotational speed of the electric generator 5.

The drive controller 22 includes the adjustor 32 and the current controller 35. The power detector 30 detects the input power Pin, which is DC power input into the power converter 10. The adjustor 32 adjusts the effective current command Iout* determined by the determiner 21 to maximize the input power Pin detected by the power detector 30. The current controller 35 controls the power converter 10 to output an AC current that is based on the effective current command Iout* adjusted by the adjustor 32. This configuration improves the accuracy of MPPT control even if a discrepancy occurs between the voltage-current correlation set in advance and an actual correlation. When the voltage-current correlation is set in advance to maximize the DC power, electric generator torque Trq that is based on the effective current command Iout* is located in the vicinity of the optimal curve (for example, the optimal curve L2 illustrated in FIG. 5). This configuration ensures that the electric generator torque Trq that is based on the effective current command Iout* is located in a region where, as illustrated in FIG. 5, increase of the electric generator torque Trq causes the generator rotational speed ωi to decrease, and decrease of the electric generator torque Trq causes the generator rotational speed ωi to increase. This configuration improves accuracy in controlling the electric generator 5 even if it is impossible or difficult to directly monitor the AC voltage or the AC current output from the electric generator 5 or directly monitor the rotational speed of the electric generator 5.

The adjustor 32 includes the adjustment amount determiner 41 and the command adjustor 42. The adjustment amount determiner 41 determines an adjustment amount to maximize the input power Pin detected by the power detector 30. The command adjustor 42 adjusts the effective current command Iout* based on the adjustment amount determined by the adjustment amount determiner 41. This configuration ensures that the effective current command Iout* is adjusted based on the adjustment amount adjusted to maximize the input power Pin. As a result, the accuracy of MPPT control improves.

The adjustment amount determiner 41 of the adjustor 32 determines the adjustment gain gt as the adjustment amount to maximize the input power Pin detected by the power detector 30. The command adjustor 42 multiplies the effective current command Iout* by the adjustment gain gt to adjust the effective current command Iout*. Using the adjustment gain gt to adjust the effective current command Iout* ensures that, for example, the amount of adjustment increases as the effective current command Iout* increases, making the MPPT control higher in speed.

The adjustment amount determiner 41 includes the power increase-decrease determiner 51, the gain increase-decrease determiner 52, and the determiner 53. The power increase-decrease determiner 51 determines the increase-decrease state of the input power Pin detected by the power detector 30. The gain increase-decrease determiner 52 determines the increase-decrease state of the adjustment gain gt. The determiner 53 determines the adjustment gain gt based on the increase-decrease state of the input power Pin determined by the power increase-decrease determiner 51 and based on the increase-decrease state of the adjustment gain gt determined by the gain increase-decrease determiner 52. Thus, the adjustment gain gt is determined based on the increase-decrease state of the input power Pin and the increase-decrease state of the adjustment gain gt. This configuration improves the accuracy of MPPT control as compared with the case where the increase-decrease state of the input power Pin alone is used to determine the adjustment gain gt.

The adjustment amount determiner 41 includes the limiter 56. The limiter 56 limits the adjustment gain gt within a predetermined limitation value range. Providing the adjustment amount determiner 41 with the limiter 56 to limit the adjustment gain gt eliminates or minimizes an excessive amount of adjustment, resulting in stable MPPT control.

The adjustment amount determiner 41 determines the adjustment value Ic as an adjustment amount to maximize the input power Pin detected by the power detector 30. The command adjustor 42 adjusts the effective current command Iout* by adding the adjustment value Ic to the effective current command Iout*. This configuration approximately equally improves the accuracy of MPPT control.

Based on a conversion table or a conversion equation set in advance based on an output characteristic(s) of the electric generation apparatus 2, the determiner 21 determines an effective power command Po* or an effective current command Iout* that has a level correlated with the level of the DC voltage Vdcin detected by the voltage detector 11. Thus, the effective power command Po* or the effective current command Iout* is determine based on a conversion table or a conversion equation set in advance based on an output characteristic(s) of the electric generation apparatus 2. This configuration facilitates the determination processing.

The rectifier 6 rectifies generation power generated by the electric generator 5 (which is a non-limiting example of the AC electric generator recited in the appended claims), and the electric generation apparatus 2 outputs the input power Pin, which is DC power output from the rectifier 6. The power converter 10 converts the input power Pin into AC power. This configuration ensures that when a wind-power electric generation apparatus equipped with elements such as the windmill 4, the electric generator 5, and the rectifier 6 outputs DC power, by setting a correlation to maximize the input power Pin, an effective power command Po* or an effective current command Iout* that enables MPPT control to be performed is obtained more efficiently.

The power conversion apparatus 1 includes the power converter 10, the voltage detector 11, and means for, based on a correlation set in advance between levels of the DC voltage and levels of the effective power command or the effective current command based on an output characteristic(s) of the electric generation apparatus 2, controlling the power converter to maximize the DC power. The means is a non-limiting example of the controller 20. This configuration improves the efficiency of MPPT control.

The power conversion apparatus 1 includes the power converter 10, the voltage detector 11, and a controller (implementable by the controller 20) or a processor (implementable by the controller 20). Based on a correlation set in advance between levels of the DC voltage Vdcin and levels of the effective power command Po* or levels of the effective current command Iout*, the controller or the processor determines an effective power command Po* or an effective current command Iout* that has a level correlated with the level of the DC voltage Vdcin detected by the voltage detector 11. Based on the determined effective power command Po* or the determined effective current command Iout*, the controller or the processor controls the power converter 10. This configuration improves efficiency in controlling the input DC power.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A power conversion apparatus comprising:
   a power converter configured to convert DC power input from an electric generation apparatus into AC power;
   a voltage detector configured to detect a DC voltage input into the power converter;
   a determiner configured to determine an output power command from a plurality of potential output power commands by comparing levels of the plurality of potential output power commands with a second level that corresponds to the DC voltage detected by the voltage detector and selecting the output power command that has a first level that correlates with the second level; and a drive controller configured to control the power converter based on the output power command determined by the determiner, wherein the drive controller comprises a current command generator configured to generate an output current command based on the output power command determined by the determiner, a power detector configured to detect the DC power input into the power converter, an adjustor configured to adjust the output current command generated by the current command generator to maximise the DC power detected by the power detector, and a current controller configured to control the power converter to output an AC current that is based on the output current command adjusted by the adjustor.

2. The power conversion apparatus according to claim 1, wherein the adjustor comprises an adjustment amount determiner configured to determine an adjustment amount to maximize the DC power detected by the power detector, and a command adjustor configured to adjust the output current command based on the adjustment amount determined by the adjustment amount determiner.

3. The power conversion apparatus according to claim 2, wherein the adjustment amount comprises an adjustment gain, and the adjustment amount determiner is configured to determine the adjustment gain to maximize the DC power detected by the power detector, and wherein the command adjustor is configured to multiply the output current command by the adjustment gain to adjust the output current command.

4. The power conversion apparatus according to claim 3, wherein the adjustment amount determiner comprises a power increase-decrease determiner configured to determine a first increase-decrease state indicating whether the DC power detected by the power detector has increased or decreased, a gain increase-decrease determiner configured to determine a second increase-decrease state indicating whether the adjustment gain has increased or decreased, and an adjustment gain determiner configured to determine the adjustment gain based on the first increase-decrease state and the second increase-decrease state.

5. The power conversion apparatus according to claim 3, wherein the adjustment amount determiner comprises a limiter configured to limit the adjustment gain to or below a limitation value set in advance.

6. The power conversion apparatus according to claim 2, wherein the adjustment amount comprises an adjustment value, and the adjustment amount determiner is configured to determine the adjustment value to maximise the DC power detected by the power detector, and wherein the command adjustor is configured to add the adjustment value to the output current command to adjust the output current command.

7. The power conversion apparatus according to claim 1, wherein based on at least one of a conversion table or a conversion equation set in advance, the determiner is configured to determine the output power command that comprises the first level correlated with the second level corresponding to the DC voltage detected by the voltage detector.

8. The power conversion apparatus according to claim 1, wherein the electric generation apparatus comprises an AC electric generator, and a rectifier configured to rectify AC power generated by the AC electric generator into DC power and configured to output the DC power, and wherein the power converter is configured to convert the DC power output from the rectifier into the AC power.

9. The power conversion apparatus according to claim 1, wherein based on an output characteristic of the electric generation apparatus, a correlation is set in advance between the second level that corresponds to the DC voltage and a third level that corresponds to the output power command, and wherein based on the correlation, the determiner is configured to determine the output power command that comprises the first level correlated with the second level of the DC voltage detected by the voltage detector.

10. The power conversion apparatus according to claim 9, wherein the adjustor comprises an adjustment amount determiner configured to determine an adjustment amount to maximize the DC power detected by the power detector, and a command adjustor configured to adjust the output current command based on the adjustment amount determined by the adjustment amount determiner.

11. The power conversion apparatus according to claim 9, wherein the adjustor comprises an adjustment amount determiner configured to determine an adjustment amount to maximize the DC power detected by the power detector, and a command adjustor configured to adjust the output current command based on the adjustment amount determined by the adjustment amount determiner.

12. The power conversion apparatus according to claim 9, wherein the adjustor comprises an adjustment amount determiner configured to determine an adjustment amount to maximize the DC power detected by the power detector, and a command adjustor configured to adjust the output current command based on the adjustment amount determined by the adjustment amount determiner.

13. A power generation system comprising:

an electric generation apparatus; and a power conversion apparatus comprising:

a power converter configured to convert DC power input from the electric generation apparatus into AC power;

a voltage detector configured to detect a DC voltage input into the power converter;

a determiner configured to determine an output power command from a plurality of potential output power commands by comparing levels of the plurality of potential output power commands with a second level that corresponds to the DC voltage detected by the voltage detector and selecting the output power command or the output current command that has a first level that correlates with the second level; and a drive controller configured to control the power converter based on the output power command determined by the determiner, wherein the drive controller comprises a current command generator configured to generate an output current command based on the output power command determined by the determiner, a power detector configured to detect the DC power input into the power converter, an adjustor configured to adjust the output current command generated by the current command generator to maximize the DC power detected by the power detector, and a current controller configured to control the power converter to output an AC current that is based on the output current command adjusted by the adjustor.

14. A controller comprising:

a determiner configured to determine an output power command from a plurality of potential output power commands by comparing levels of the plurality of potential output power commands with a second level corresponding to a DC voltage input into a power converter from an electric generation apparatus and selecting the output power command that has a first level that correlates with the second level; and a drive controller configured to control the power converter based on the output power command determined by the determiner, wherein the drive controller comprises a current command generator configured to generate an output current command based on the output power command determined by the determiner, a power detector configured to detect the DC power input into the power converter, an adjustor configured to adjust the output current command generated by the current command generator to maximize the DC power detected by the power detector, and a current controller configured to control the power converter to output an AC current that is based on the output current command adjusted by the adjustor.

15. A method for converting power, the method comprising:

detecting a DC: voltage input into a power converter from an electric generation apparatus;

determining an output power command from a plurality of potential output power commands by comparing levels of the plurality of potential output power commands with a second level corresponding to the DC voltage detected in the detecting step and selecting the output power command that has a first level that correlates with the second level; and controlling the power converter based on the output power command determined in the determining step, wherein the controlling further comprises generating an output current command based on the determined output power command, detecting the DC power input into the power converter, adjusting the generated output current command to maximize the detected DC power, and controlling the power converter to output an AC current that is based on the adjusted output current command.

16. A power conversion apparatus comprising: a power converter configured to convert DC power input from an electric generation apparatus into AC power;

a voltage detector configured to detect a DC voltage input into the power converter; means for, controlling the power converter to maximize the DC power by determining an output power command from a plurality of potential output power commands by comparing levels of the plurality of potential output power commands with a second level that corresponds to the DC voltage detected by the voltage detector, by selecting the output power command that has a first level that correlates with the second level, by controlling the power converter based on the determined output power command, and by generating an output current command based on the determined output power command, detecting the DC power input into the power converter, adjusting the generated output current command to maximize the detected DC power, and controlling the power converter to output an AC current that is based on the adjusted output current command.

\* \* \* \* \*

UNITED STATES PATENT AND TRADEMARK OFFICE
CERTIFICATE OF CORRECTION

PATENT NO. : 10,256,740 B2
APPLICATION NO. : 15/335469
DATED : April 9, 2019
INVENTOR(S) : Hirotaka Toujinbara et al.

It is certified that error appears in the above-identified patent and that said Letters Patent is hereby corrected as shown below:

In the Claims

Column 20 Claim 12, Line 36, please change from "9" to --10--;

Column 20 Claim 13, Line 57, please delete the phrase "or the output current command";

Column 22 Claim 15, Line 3, please delete the word "step";

Column 22 Claim 15, Line 7, please delete the word "step".

Signed and Sealed this
Fifteenth Day of September, 2020

Andrei Iancu
*Director of the United States Patent and Trademark Office*